United States Patent [19]
Letter

[11] Patent Number: 5,140,457
[45] Date of Patent: Aug. 18, 1992

[54] REFLECTOR FOR DISPLAY LIGHTING

[75] Inventor: Eugene C. Letter, Rochester, N.Y.

[73] Assignee: Bausch & Lomb Incorporated, Rochester, N.Y.

[21] Appl. No.: 613,180

[22] Filed: Nov. 13, 1990

[51] Int. Cl.$^5$ .................................................. G02B 5/28
[52] U.S. Cl. .................................... 359/359; 359/360; 359/585; 359/589
[58] Field of Search ................ 350/1.6, 1.7, 164, 642; 359/359, 360, 580, 585, 589

[56] References Cited

U.S. PATENT DOCUMENTS

| | | | |
|---|---|---|---|
| 3,645,600 | 2/1972 | Doctoroff et al. | 350/1.7 |
| 3,944,320 | 3/1976 | McLintic | 350/1.7 |
| 4,057,316 | 11/1977 | Hacman et al. | 350/1.6 |
| 4,309,075 | 1/1982 | Apfel et al. | 350/164 |
| 4,556,277 | 12/1985 | Fan et al. | 350/1.7 |
| 4,705,356 | 11/1987 | Berning et al. | 350/166 |
| 4,721,349 | 1/1988 | Fan et al. | 359/360 |
| 4,749,255 | 6/1988 | Chakrabarti | 350/164 |
| 4,799,745 | 1/1989 | Meyer et al. | 350/1.7 |
| 4,838,629 | 6/1989 | Maruyama et al. | 350/1.6 |
| 5,007,689 | 4/1991 | Kelly et al. | 359/580 |

OTHER PUBLICATIONS

"Induced Transmission in Absorbing Films Applied to Band Pass Filter Design", P. H. Berning and A. F. Turner, Journal of the Optical Society of America, vol. 47(3), 230-239 (Mar. 1957), pp. 505-514.

"Thin-Film Optical Filters", H. A. Macleod, Macmillan Publishing Company, pp. 295-313 and 499-501.

Primary Examiner—Bruce Y. Arnold
Assistant Examiner—J. P. Ryan
Attorney, Agent, or Firm—James B. Bieber

[57] ABSTRACT

A cold mirror reflector comprising; a reflector substrate; a first high refractive index thin layer disposed upon at least one surface of said reflector substrate which is about one quarter design wavelength in thickness; a relatively thin layer of a highly reflective metal material disposed upon said first high refractive index thin layer; and a second high refractive index thin layer disposed outwardly from said metal thin layer which is about one quarter design wavelength in thickness.

12 Claims, 6 Drawing Sheets

REFLECTOR FOR DISPLAY LIGHTING

Reflectors have been an essential component of lighting applications for many years. Various types of reflectors are in use ranging from simple polished metal reflectors to highly specular coated glass and plastic reflectors. These coated reflectors may have a single layer coating of a reflective metal, a protected reflective metal, an enhanced metal coating or a complex multilayer coating which can provide both color correction and reduction of unwanted regions of radiation for specific lighting application. For example, in applications such as movie projectors, slide projectors and overhead viewers it is desirable to reduce the heat or infrared component of the reflected light as much as possible. These reflectors are known as cold mirrors because of their ability to reduce the amount of heat (infrared radiation) present in the reflected beam.

Typically, cold mirror coatings are based on combining two or more high reflectance arrays. A high reflectance array consists of alternating layers of high and low index films, each layer having an optical thickness of one Quarter-Wave Optical Thickness (QWOT). The optical thickness is defined as the product of the physical thickness times the refractive index of the film. The QWOT is referenced to a conveniently chosen design wavelength. For example, at a design wavelength of 500 nm. a QWOT equals 125 nm. Since a single high reflectance array reflects across only a portion of the visible region, two or more arrays must be combined for an extended high reflectance band across the visible spectrum. Various designs are used, the simplest approach using a second array at a greater design wavelength than the first array. To avoid transmission leaks the two arrays are joined with a matching layer.

The cold mirror reflectors described above have achieved a high degree of acceptance in display lighting applications where their high degree of reflectance of visible light of the proper color temperature has been found very attractive in merchandising. In many of these applications heat or infrared reduction is less important than in projection applications and, in some instances, as when these reflectors are used in certain enclosed luminaires containing electrical components, the infrared transmitted backward into the electrical components is a disadvantage as it overheats these components causing premature failure. In other instances, it is desirable to reduce the ultraviolet radiation as it can cause fading of certain merchandise and of other objects, including art objects and furniture. Therefore, a combination of high visible reflectance, good color maintenance over the life of the reflector, and the ability to select varying degrees of infrared and ultraviolet reduction have emerged as important factors in applications of display lighting coatings. Cold mirror reflectors with their many layers represent a very complex solution to display lighting. On the other hand, metal reflectors do not provide as high a level of reflectance. The enhanced metal reflector is capable of high visible light reflectance but has limited ability to further reduce the proportion of infrared energy and ultraviolet energy in the reflected beam.

SUMMARY OF THE INVENTION

The present invention relates to a novel reflector which is able to provide high reflectance of visible radiation and controlled transmission of energy in the infrared and ultraviolet regions of the spectrum. The novel reflector achieves this effect using fewer layers than the typical cold mirror reflector, both lowering costs and enabling improved control of quality by reducing complexity. To accomplish this, the invention takes advantage of the extended spectral reflectivity of thin metal films to achieve reflectance across the entire visible range and makes use of the concept of induced transmission to achieve transmission in the infrared or other selected region. To achieve the highest possible induced transmission it is desirable to use as thin a metal film as possible while still maintaining high visible reflectance. In certain embodiments of the invention the visible reflection is increased with a high reflectance array of alternating high and low index films. However, relatively few layers are required as compared to the typical all dielectric cold mirror coating referred to above because the thin metal layer accomplishes much of the visible reflectivity.

The invention is comprised of a reflector substrate upon which is disposed a plurality of thin film coatings. In one embodiment of the invention a high index interference film is disposed upon the reflector substrate surface. Disposed on this first high index film is a thin metal film of a highly reflective metal. Disposed outwardly from this thin metal film is a second high index interference film. In other embodiments of this invention one or both of the high index interference films are replaced with high reflectance arrays.

DETAILED DESCRIPTION OF THE INVENTION

Figure 1:
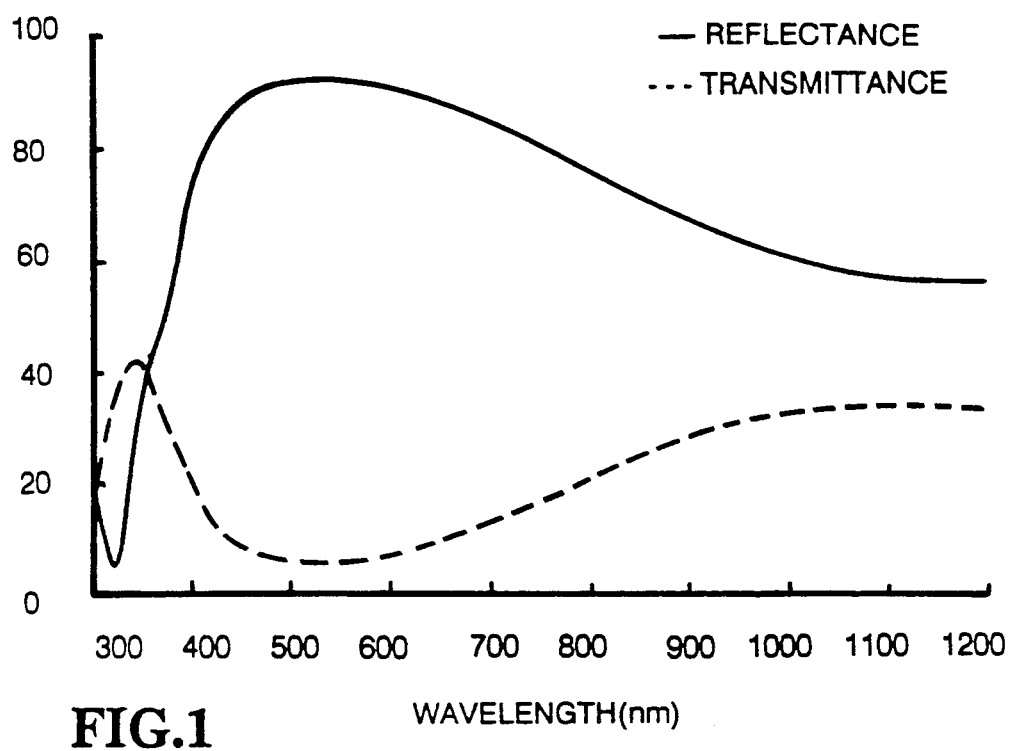

The present invention relates to a lighting reflector which has high reflectance of visible light, good color control of the reflected light, selective transmission in the infrared and ultraviolet spectral regions and which has fewer thin film layers than a typical cold mirror all dielectric coated reflector. The present invention calls for a reflector; a reflector substrate, a first thin film array disposed upon said substrate, a thin metal film disposed on the first thin film array, a second thin film array disposed outwardly from the thin metal film, with the reflector assembly so arranged that light is incident upon the outermost portion of the second thin film array. This is schematically represented by the formula (1) shown below while other embodiments are given as 2) through 8).

1) G S M S' ← incident light
2) G S' M S ← incident light
3) G S M S' O ← incident light
4) G S' M S O ← incident light
5) S' M S G ← incident light
6) S M S' G ← incident light
7) O S' M S G ← incident light
8) O S M S' G ← incident light The symbols have the following meanings:
G = Reflector Substrate which does not reflect in the infrared region
S = First Thin Film Array
S' = Second Thin Film Array
M = Thin Metal Layer
O = Thick Protective Overcoat The concept of induced transmission in a thin metal film was first described by Berning, P.H. and Turner, A.F., "Induced Transmission in Absorbing Films Applied to Band Pass Filter Design", Journal of the Optical Society of America, 47, 230–239, (1957). The concept was used to design a narrow band pass filter with a pass band at 546 nm. wavelength. The objective of a band pass filter design is generally to obtain as high a transmission as possible over as narrow a wavelength region as possible with low transmission in other wavelength regions. The objective of the induced transmission cold mirror is different in that as wide a band of infrared transmission as possible is generally wanted in the infrared wavelength region while high, uniform reflectance of white light is provided over the visible wavelength region. It is desirable to accomplish this dual objective with as few thin film layers as possible. This is made possible by using a thin metal film to replace a number of layer in a reflecting array. To accomplish the first part of this dual objective, a design wavelength is selected near the center of the infrared region in which infrared transmission is desired. For example, this wavelength may be selected to coincide with the peak infrared emission of the source. At the infrared design wavelength the admittance of the selected thin metal layer is calculated and the admittance of the surrounding thin film arrays matched to it to obtain maximum infrared transmission in the chosen region. A detailed design procedure to accomplish this is set forth by Macleod, H.A., "Thin-Film Optical Filters", Macmillan Publishing Company, 295-313, 499-501.

To accomplish the second part of the objective, high, uniform reflectance of visible light, while keeping the metal film sufficiently thin to allow infrared transmission, the matching array is designed to be a high reflectance array in the visible region, consisting of alternating layers of high refractive index (H) and low index (L) films each a Quarter-Wave Optical Thickness (QWOT) as referenced to a design wavelength selected near the center of the visible region. For example, a high reflectance array for the visible region, referenced to a design wavelength of 500 nm., may be represented by the following designation:

0.25L 0.25H 0.25L 0.25H ← incident light where 0.25L is a QWOT of a low index film at a design wavelength of 500 nm. and 0.25 H is a QWOT of a high index film at a design wavelength of 500 nm. The same array referenced to an infrared design wavelength of 1000 nm., which, for example, could be selected for admittance matching would be designated by:

0.125L 0.125H 0.125L 0.125H ← incident light

By serendipity, these arrays are equivalent and the actual physical thickness of the layers are the same for both cases, the designation being a design convenience. For clarity, the examples which follow will be all referenced to a visible design wavelength of 500 nm. for the high and low index films. The actual physical thickness will be given for all metal films. Thin film arrays also include a single high index film of quarter wave optical thickness (Q.W.O.T.).

For instance, a high reflectance array could be used in the embodiment:

1) G S M S' ← incident light for both arrays or for one array. In the first variation, using a thin Ag film of 25 nm. thickness a starting design at a design wavelength of 500 nm. can be chosen as:

G 0.25H 0.25L 0.25H 0.25L 25Ag 0.25L 0.25H 0.25L 0.25H.

Figure 10:
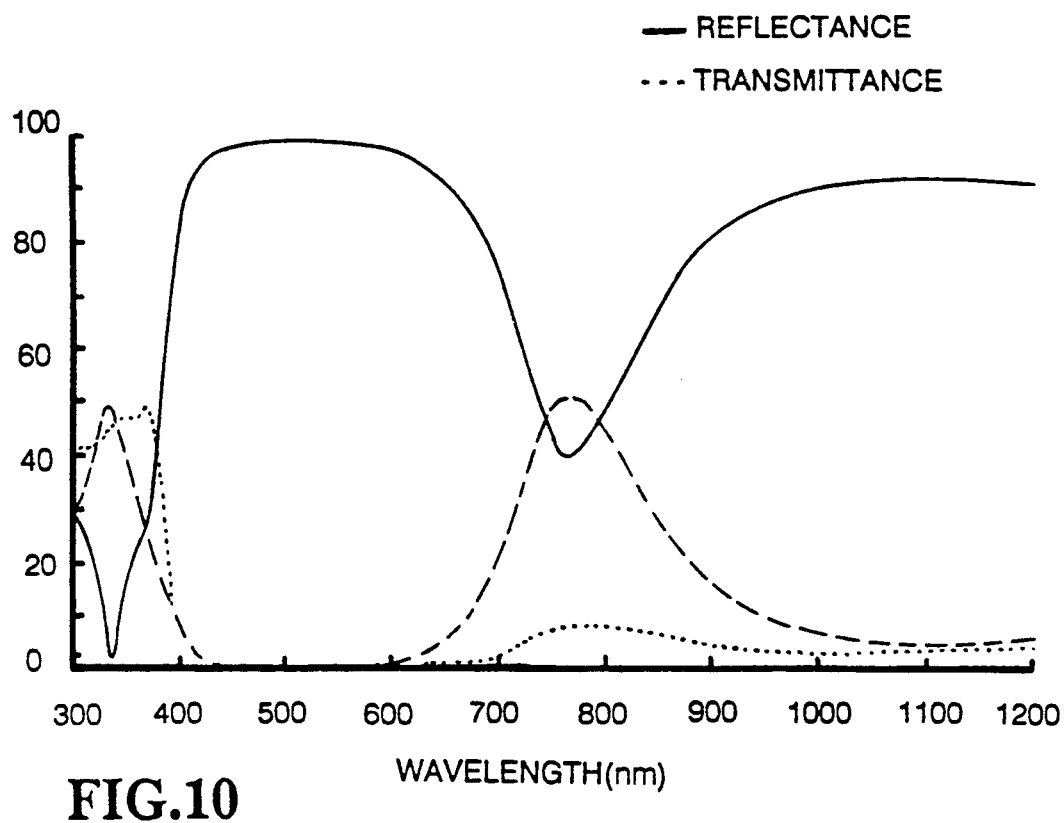

The layers on either side of the metal layer are then adjusted in thickness to obtain maximum transmission near 800 nm. resulting in the final design:

G 0.25H 0.25L 0.25H 0.17L 25Ag 0.17L 0.25H 0.25L 0.25H.

with reflectance and transmission as shown in FIG. 10 for an index of 2.5 for H and an index of 1.46 for L. The thickness of the layers adjacent the thin metal films could be designated alpha and beta and may vary from design to design, but can be calculated by known means. Thus, in the above example alpha and beta would have values of 0.17 W.O.T.

Figure 4:
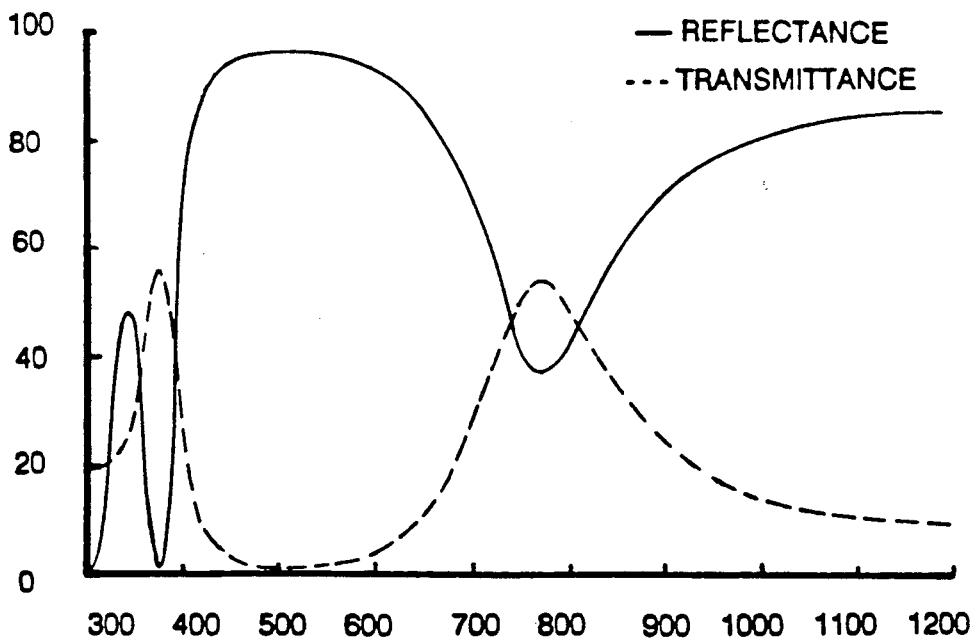
Figure 11:
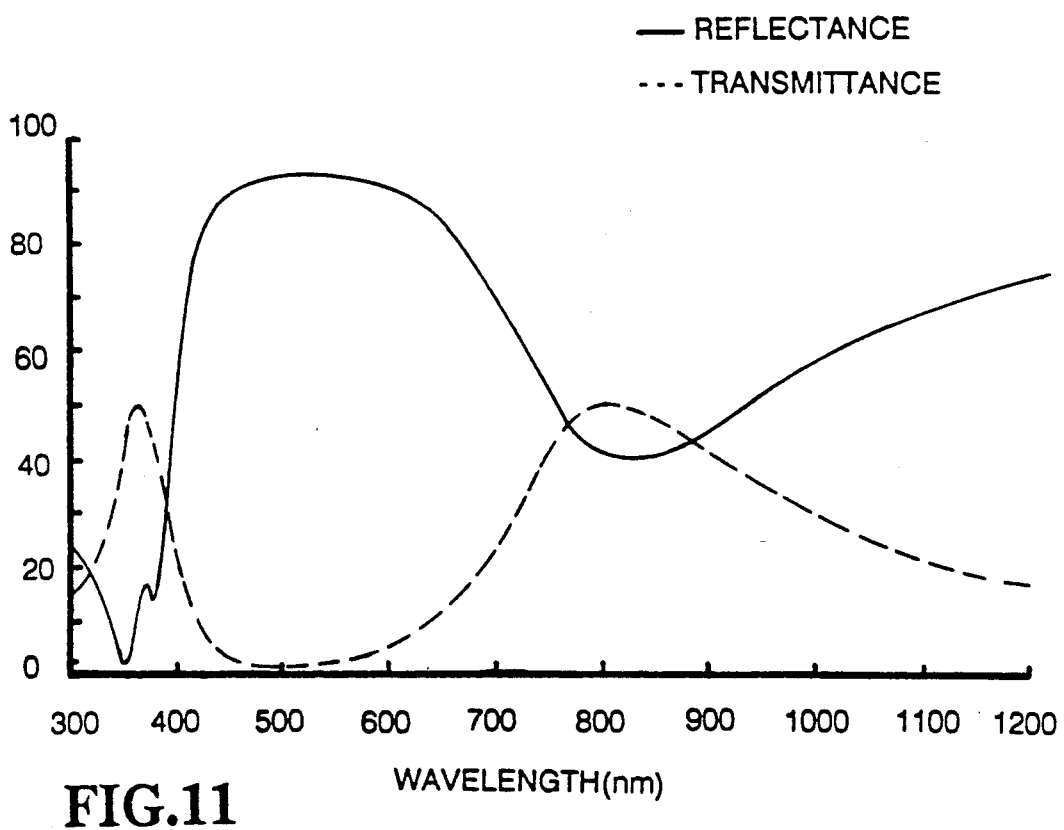

In the second variation, using a thin film of the metal silver at 25 nm. physical thickness, a starting design can be chosen as:

G 0.25H 25Ag 0.25H 0.25L 0.25L 0.25H at a design wavelength 500 nm.

where a high reflectance array is selected for S' on the incident side and a single layer of high index material is selected for S on the emergent side. The layers on either side of the metal layer are then adjusted to obtain maximum transmission near 800 nm. resulting in the final design:

G 0.35H 25Ag 0.17L 0.25H 0.25L 0.25H at a design wavelength 500 nm.

with reflectance and transmittance as shown in FIG. 4 for an index of 2.5 for H and an index of 1.46 for L. If the design, is reversed as in 2) G S' M S ← incident light, we obtain G 0.25H 0.25L 0.25H 0.17H 25Ag 0.35H at a design wavelength 500 nm.

with reflectance and transmittance as shown in FIG. 11 with an index of 2 5 for H and an index of 1.46 for L. Note that reversing the position of the arrays in the designs has resulted in a wider transmission band in the infrared with a slight decrease in the visible reflectance.

In general, as high an index difference as possible is desired for the L and H films to obtain maximum reflectivity. A high H index is also useful for inducing infrared transmission. In the infrared Ge has a complex index of 4.62-10.12 at 1000 nm. When used for the S array in 1) G S M S' ← incident light the following design is obtained:

G 0.35Ge 25Ag 0.17L 0.25H 0.25L 0.25H at a design wavelength 500 nm.

which has a broader visible reflectance band and increased infrared transmission band as compared to G 0.35H 25Ag 0.17L 0.25H 0.25L 0.25H at a design wavelength 500 nm.

where H has a 2.5 index. It is important to note that Ge and similar materials have a high absorption in the visible and that the Ge layer must be used on the emergent side of the coating and not on the incident side if high reflectance is wanted for the incident light.

As noted above, an additional layer may be added as a protective overcoat if desired. Appropriate adjustments in layer thickness are made to maintain optimum optical properties. Various high temperature resins have been found to work well. These include siloxane resins marketed as Glass Resins by OI-NEG TV Products Inc. such as Glass Resins Type 950M and 950F, and General Electric silicone resin SR-112. Colored resins can also be used as both a protective overcoat and to adjust the color of the reflected light.

The low refractive index materials used in the present invention are materials with refractive indices in the range of about 1.25 to about 1.50 and include, but are not limited to, $SiO_2$, $MgF_2$, NaF, LiF, $CaF_2$, $AlF_3$, $Na_3$, $AlF_6$ and $5NaF.3AlF_3$. The preferred low refractive index materials are silicon dioxide and magnesium fluoride. The layers of this material are between about 40 and 140 nm in thickness although for design purposes the thickness of the film is more typically expressed in fractions of a particular design wavelength.

The high refractive index materials have refractive indices in the range of about 1.8 to about 4 or more and include, but are not limited to, the following materials: titanium oxide $TiO_2$, cerium oxide $CeO_2$, tantalum pentoxide $Ta_2O_5$, zinc sulfide ZnS, niobium pentoxide $Nb_2O_5$, zirconium oxide $ZrO_2$, yttrium oxide ($Y_2O_3$), thallous chloride (TlCl), praseodymium oxide ($Pr_6O_{11}$), lanthanum oxide ($LA_2O_3$), hafnium oxide ($HfO_2$), bismuth oxide ($Bi_2O_3$), tungsten trioxide ($WO_2$), tungsten pentoxide ($W_2O_5$), zinc oxide (ZnO), zircon ($ZnSiO_4$), tin oxide ($SnO_2$), scandium oxide ($Sc_2O_3$), silicon monoxide (SiO), cadmium telluride (CdTe), antimony sulfide ($Sb_2S_3$), antimony trioxide ($Sb_2O_3$), cadmium sulfide (Cds), and tellurium (Te), as well as certain semiconductor materials such as silicon, and germanium. The preferred high refractive index dielectric materials are titanium dioxide, zinc sulfide and niobium pentoxide. The layers of these types of material are generally about 40 to 140 nm in thickness.

The semiconductor and other materials which absorb in the visible portion of the spectrum should be used in the thin film assembly on the side opposite the thin metal film reflecting surface of the reflector from which high visible reflection is desired. The highly reflective metal materials include silver, aluminum, chromium and combinations and alloys of the same including AgPd. Depending upon the color temperature desired, other metals may also be employed. The thickness of the thin metal films is in the range of 10 to 100 nm (preferably in the range of 20 to 35 nanometers).

GENERAL METHODS FOR MAKING THE INVENTION

The reflectors of the present invention can be manufactured by means of depositing on the reflector blank a series of thin films by means known to those skilled in the art of thin film manufacture. For instance, a reflector blank will be cleaned and prepared for coating by washing the surface of the reflector in order to remove foreign material contamination, and then placing the device in a fixture in a coating apparatus. The reflector blank may then be subjected to elevated temperature and a low pressure inert atmosphere.

The first dielectric layer, the high refractive index layer, may be applied to the substrate surface of the reflector by any number of means known to those skilled in the art. The preferred methods are vacuum deposition means where the high refractive index material is deposited from an electron beam gun source, or the material can be "sputtered" onto the target substrate.

The thin metal layer deposited upon the first thin layer of high refractive index material can be deposited by a number of methods, the preferred methods are vacuum evaporation deposition techniques and sputtering. Other thin film coating techniques can be employed.

COLD MIRROR REFLECTOR FILM DESIGNS OF THE INVENTION

The following film designs exemplify the invention.

EXAMPLE 1 - S M S' DESIGN

A substrate with an index of refraction of 1.5 was coated with the following thin film array where the low index material, "L" was $SiO_2$ and the high index material "H" was $TiO_2$. The metal layer was silver. Numbered outwardly from the substrate, the layer configuration was: layer number 1.-0.37 wave optical thickness (W.O.T.) of H; layer number 2.-0.25 nanometers of silver; layer number 3.-0.17 W.O.T. of L, and layer number 4.-0.25 W.O.T. of H. The transmittance of the reflector is given in FIG. 1 where the solid line represents the theoretical reflectance, the broken line represents theoretical transmittance, and the dotted line represents the actual reflectance.

EXAMPLE 2 - S M S' DESIGN

A flat substrate was cleaned and prepared. The following thin film array was deposited:

| Layer No. | Material | Thickness |
|---|---|---|
| 1 | silicon | 50 nanometers |
| 2 | silver | 24 nanometers |
| 3 | $SiO_2$ | .17 wave optical thickness (W.O.T.) |
| 4 | $TiO_2$ | .25 W.O.T. |

Figure 2:
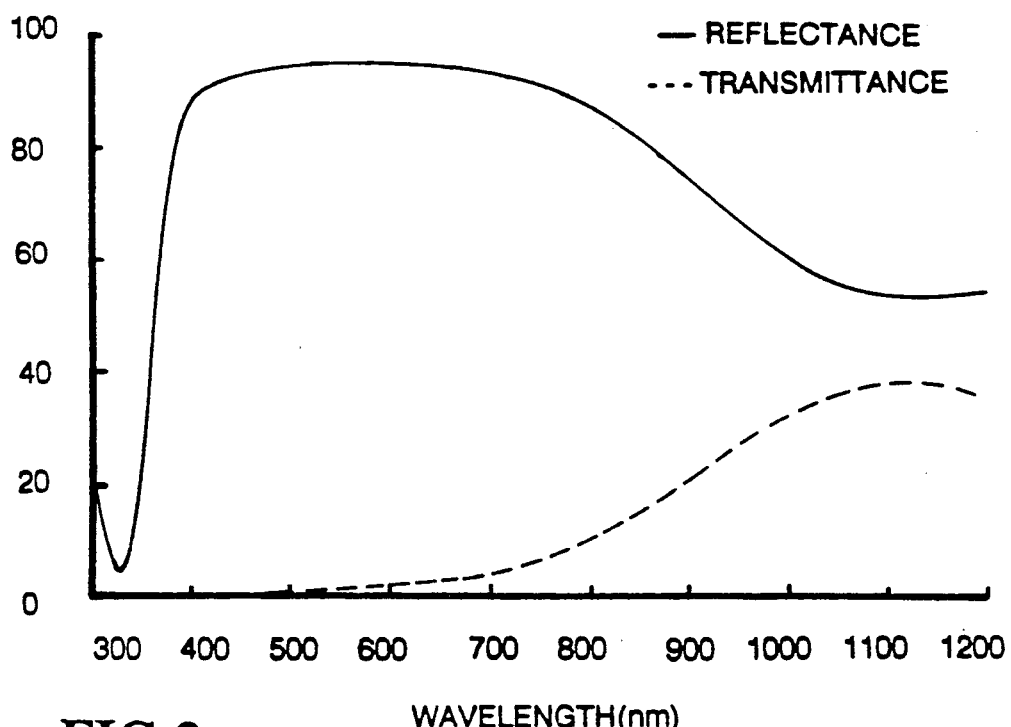

The design wavelength used was 500 nm. This film gave a reflectance and transmittance curve shown in FIG. 2.

EXAMPLE 3 - S M S' DESIGN

A flat reflector substrate was prepared and deposited with the following thin film array:

| Film No. | Material | Thickness |
|---|---|---|
| 1 | germanium | 30 nanometers |
| 2 | silver | 30 nanometers |
| 3 | $SiO_2$ | .17 W.O.T. |
| 4 | $TiO_2$ | .25 W.O.T. |

Figure 3:
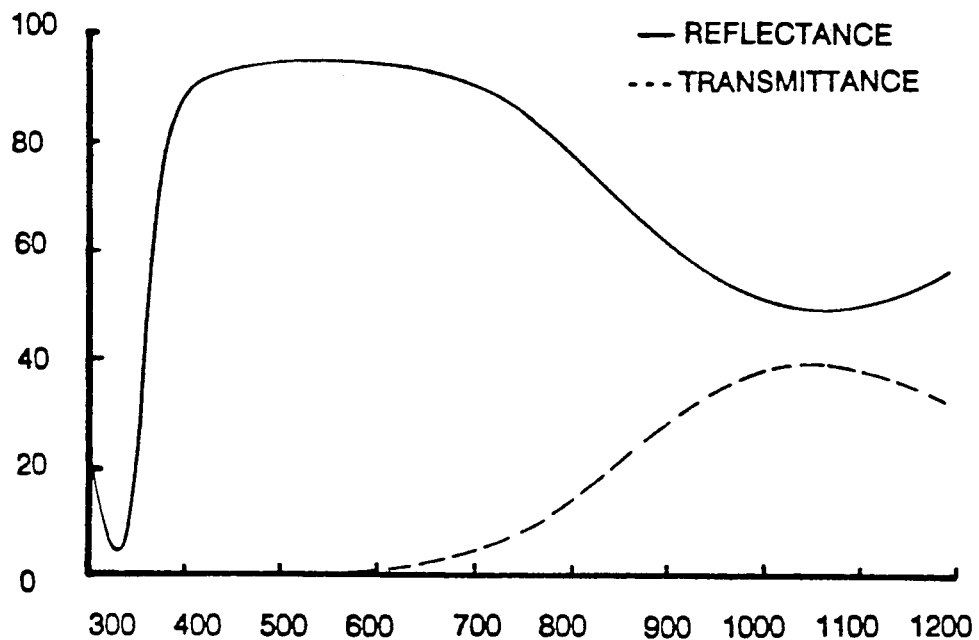

The reflectance and transmission curves are shown in FIG. 3.

EXAMPLE 4 - H M S DESIGN

A flat reflector was prepared and then deposited with the following film design:

| Film No. | Material | Thickness |
|---|---|---|
| 1 | $TiO_2$ | .35 W.O.T. |
| 2 | silver | 25 nanometers |

-continued

| Film No. | Material | Thickness |
|---|---|---|
| 3 | $SiO_2$ | .17 W.O.T. |
| 4 | $TiO_2$ | .25 W.O.T. |
| 5 | $SiO_2$ | .25 W.O.T. |
| 6 | $TiO_2$ | .25 W.O.T. |

The reflectance and transmission curves of this reflector are shown in FIG. 4.

EXAMPLE 5 - S M S' DESIGN

A flat reflector was prepared and then deposited with the following film design:

| Film No. | Material | Thickness |
|---|---|---|
| 1 | germanium | 35 nanometers |
| 2 | silver | 20 nanometers |
| 3 | $SiO_2$ | .17 W.O.T. |
| 4 | $TiO_2$ | .25 W.O.T. |
| 5 | $SiO_2$ | .25 W.O.T. |
| 6 | $TiO_2$ | .25 W.O.T. |

Figure 5:
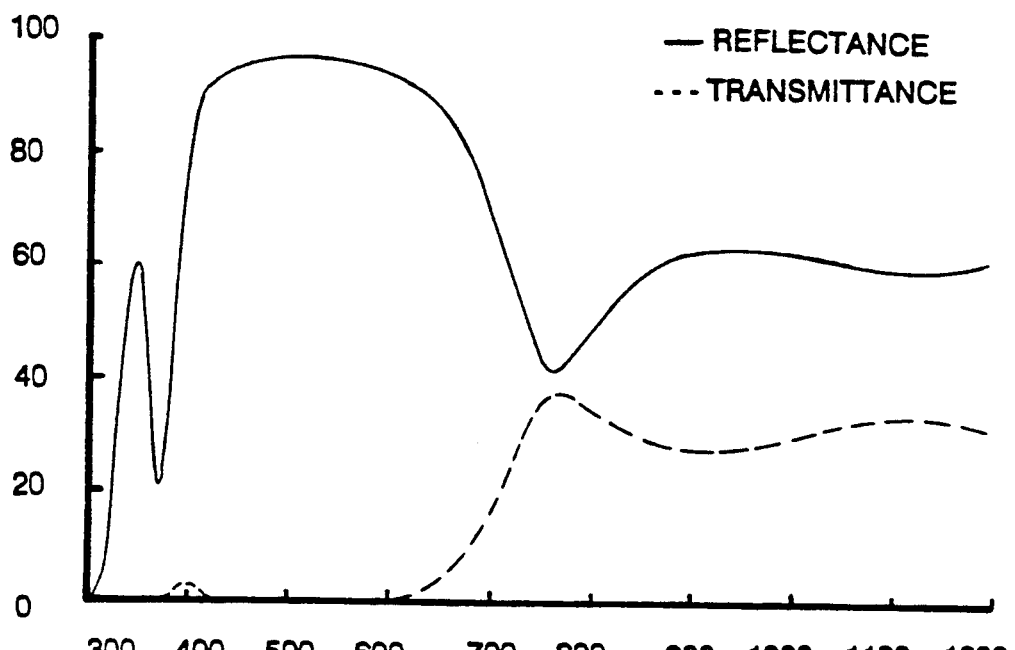

The reflectance curve is shown in FIG. 5.

EXAMPLE 6 - S M S' DESIGN

A flat reflector was prepared and then deposited with the following six layer film design:

| Film No. | Material | Thickness |
|---|---|---|
| 1 | silicon | 50 nanometers |
| 2 | silver | 20 nanometers |
| 3 | $SiO_2$ | .17 W.O.T. |
| 4 | $TiO_2$ | .25 W.O.T. |
| 5 | $SiO_2$ | .25 W.O.T. |
| 6 | $TiO_2$ | .25 W.O.T. |

Figure 6:
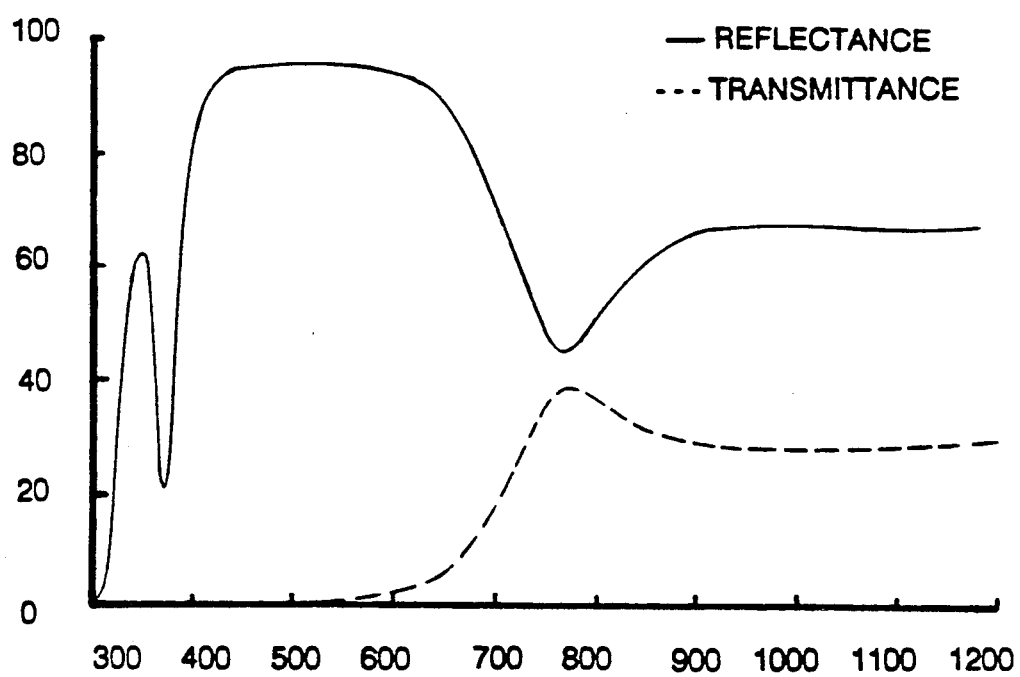

The reflectance curve is shown in FIG. 6.

EXAMPLE 7 - S' M S' DESIGN

A reflector substrate was prepared and the following seven layer reflector film design was deposited:

| Film No. | Material | Thickness |
|---|---|---|
| 1 | $TiO_2$ | .16 W.O.T. |
| 2 | $SiO_2$ | .26 W.O.T. |
| 3 | $TiO_2$ | .21 W.O.T. |
| 4 | silver | 35 nanometers |
| 5 | $TiO_2$ | .23 W.O.T. |
| 6 | $SiO_2$ | .15 W.O.T. |
| 7 | $TiO_2$ | .36 W.O.T. |

Figure 7:
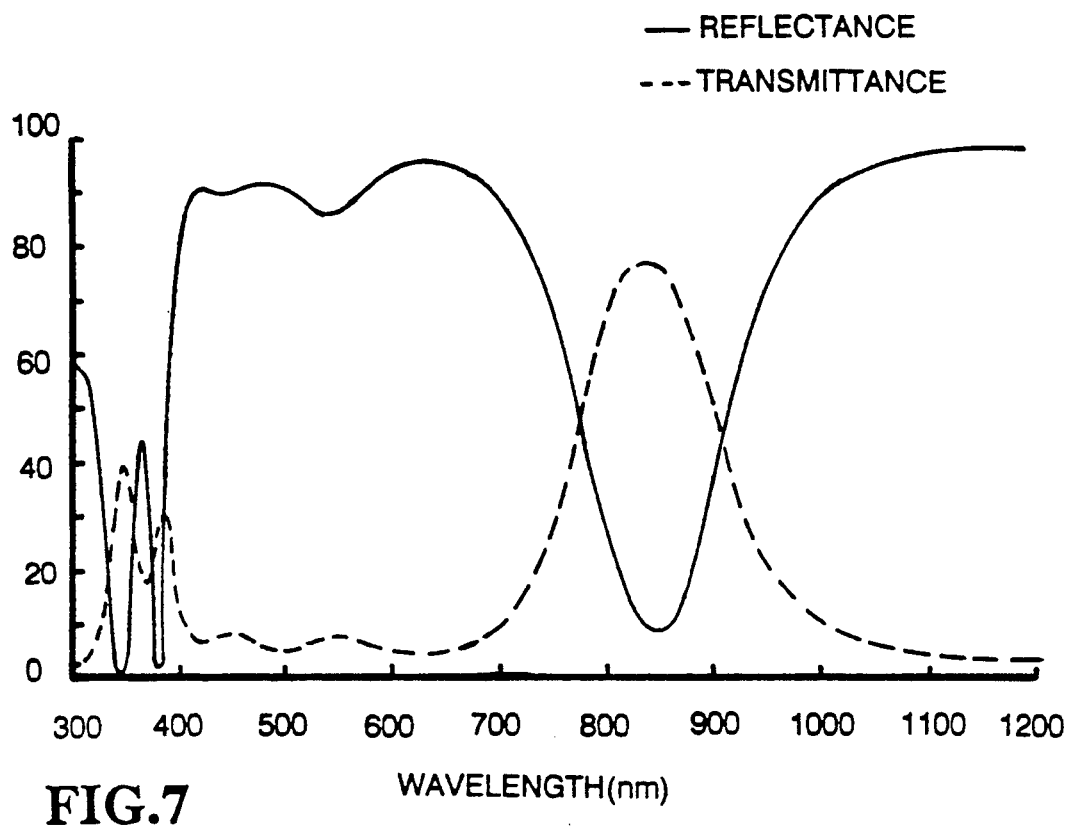

The reflectance curve is shown in FIG. 7.

EXAMPLE 8 - S M S' DESIGN

A reflector substrate was prepared and the following seven layer reflector film design was deposited:

| Film No. | Material | Thickness |
|---|---|---|
| 1 | $TiO_2$ | .26 W.O.T. |
| 2 | $SiO_2$ | .46 W.O.T. |
| 3 | $TiO_2$ | .29 W.O.T. |
| 4 | $SiO_2$ | .06 W.O.T. |
| 5 | silver | 25 nanometers |
| 6 | $SiO_2$ | .06 W.O.T. |
| 7 | $TiO_2$ | .30 W.O.T. |

Figure 8:
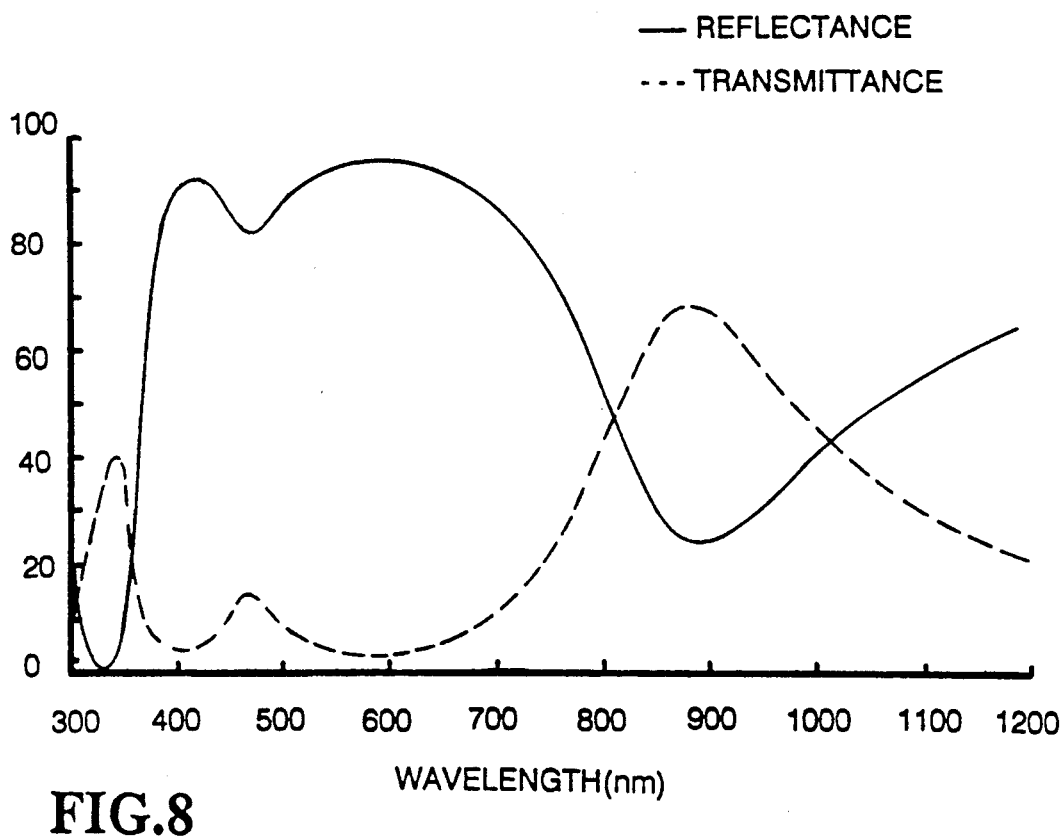

The reflectance curve is shown in FIG. 8.

COMPARATIVE EXAMPLE - STATE OF THE ART

A commercial cold metal reflector has the following film design:

| Film No. | Material | Thickness |
|---|---|---|
| 1 | $TiO_2$ | .125 W.O.T. |
| 2 | $SiO_2$ | .256 W.O.T. |
| 3 | $TiO_2$ | .25 W.O.T. |
| 4 | $SiO_2$ | .25 W.O.T. |
| 5 | $TiO_2$ | .25 W.O.T. |
| 6 | $SiO_2$ | .25 W.O.T. |
| 7 | $TiO_2$ | .25 W.O.T. |
| 8 | $SiO_2$ | .25 W.O.T. |
| 9 | $TiO_2$ | .25 W.O.T. |
| 10 | $SiO_2$ | .25 W.O.T. |
| 11 | $TiO_2$ | .293 W.O.T. |
| 12 | $SiO_2$ | .3375 W.O.T. |
| 13 | $TiO_2$ | .3375 W.O.T. |
| 14 | $SiO_2$ | .3375 W.O.T. |
| 15 | $TiO_2$ | .3375 W.O.T. |
| 16 | $SiO_2$ | .3375 W.O.T. |
| 17 | $TiO_2$ | .3375 W.O.T. |
| 18 | $SiO_2$ | .3375 W.O.T. |
| 19 | $TiO_2$ | .3375 W.O.T. |
| 20 | $SiO_2$ | .3375 W.O.T. |
| 21 | $TiO_2$ | .168 W.O.T. |

Figure 9:
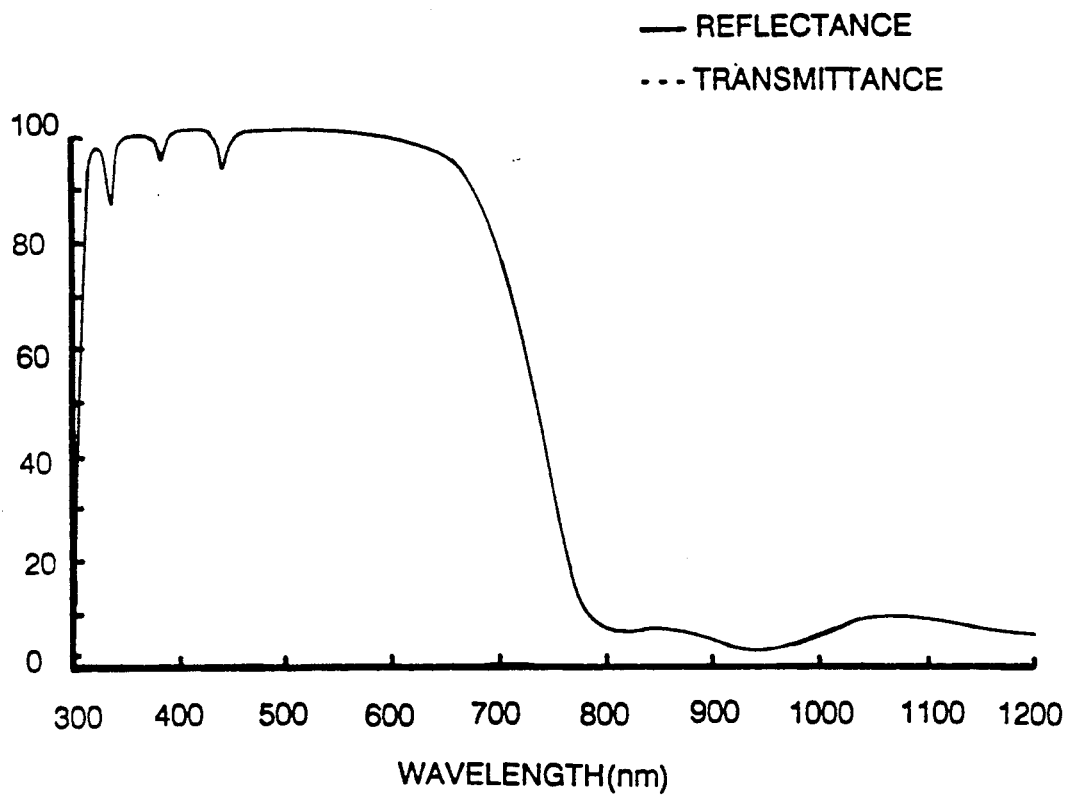

The reflectance curve for this reflector is shown in FIG. 9.

As can be appreciated by the examples, cold mirror reflectors can be manufactured using significantly fewer thin films than has been heretofore available commercially through practice of the present invention.

What is claimed is:

1. A reflector, comprising:
   a reflector substrate, G, that does not reflect infrared radiation;
   a first thin film array, S, disposed upon at least one surface of said reflector substrate;
   a relatively thin metal layer, M, that is a highly reflective metal material disposed upon said first thin film array, M limited in thickness, such that infrared radiation transmission is induced; and
   a second thin film array, S', on the opposite side of said metal thin layer from said first thin film array S wherein said reflector is schematically represented as GSMS', GS'MS, S'MSG or SMS'G←incident light wherein S and S' are one or more layers H or L, each said layer a material that is of high refractive index (H) or low refractive index (L) and at least one of S or S' is highly reflective of visible light comprising a plurality of alternating layers of H and L.

2. The reflector of claim 1 wherein the reflector is schematically represented as G S M S'←incident light wherein S' is schematically represented as array 0.25 H (0.25 L 0.25 H)n←incident light, thicknesses of said H or L are quarter wave optical thicknesses (Q.W.O.T.) for a design wavelength of about 500 nm, and n is an integer from 0 to 3.

3. The reflector of claim 1 wherein the reflector configuration is represented as G S M S'—incident light wherein S' is schematically represented as alpha L 0.25 H (0.25 L 0.25 H)$_n$—incident light thicknesses are given in quarter wave optical thicknesses (Q.W.O.T.) for a design wavelength of about 500 nm, n is an integer from 0 to 3 and alpha expressed in fractional wave optical thickness (W.O.T.) is a value chosen to maximize infrared transmission.

4. The reflector of claim 1 wherein the reflector configuration is represented as G S M S'—incident light wherein S is schematically represented as array (0.25 L 0.25 H)$_n$ beta L—incident light thicknesses are given in quarter wave optical thicknesses (Q.W.O.T.) for a design wavelength of about 500 nm, n is an integer from 0 to 3 and beta as expressed in fractional wave optical thickness (W.O.T.) is a value which maximizes infrared transmission.

5. The reflector of claim 1 wherein the reflector configuration is represented as G S M S'—incident light wherein S is schematically represented as (0.25 H 0.25 L)n beta H—incident light thicknesses are given in quarter wave optical thicknesses fractional wave optical thickness (W.O.T.) for a design wavelength of about 500 nm, n is an integer from 0 to 3 and beta is a thickness which optimizes infrared transmission.

6. The reflector of claim 1 wherein the reflector configuration is represented as S' M S G—incident light wherein S is schematically represented as array beta L (0.25 H 0.25 L)$_n$—incident light thicknesses are given in quarter wave optical thicknesses (Q.W.O.T.) for a design wavelength of about 500 nm, n is an integer from 0 to 3 and beta as expressed in fractional wave optical thickness (W.O.T.) is a value which maximizes infrared transmission.

7. The reflector of claim 1 wherein the reflector configuration is represented as S' M S G—incident light wherein S is schematically represented as array beta H (0.25 L 0.25 H)$_n$—incident light thicknesses are given in quarter wave optical thicknesses (Q.W.O.T.) for a design wavelength of about 500 nm, n is an integer from 0 to 3 and beta as expressed in fractional wave optical thickness (W.O.T.) is a value which maximizes infrared transmission.

8. The reflector of claim 1 wherein the reflective metal material is silver, aluminum or chromium.

9. The reflector of claim 1 wherein said low refractive index material is $SiO_2$, $MgF_2$, NaF, LiF, $CaF_2$, $AlF_3$, $Na_3$, $AlF_6$ or $5NaF.3AlF_3$.

10. The reflector of claim 1 wherein said high refractive index material is titanium oxide $TiO_2$, cerium oxide $CeO_2$, tantalum pentoxide $Ta_2O_5$, zinc sulfide ZnS, niobium pentoxide $Nb_2O_5$, zirconium oxide $ZrO_2$, yttrium oxide ($Y_2O_3$), thallous chloride (TlCl), praseodymium oxide ($Pr_6O_{11}$), lanthanum oxide ($LA_2O_3$), hafnium oxide ($HfO_2$), bismuth oxide ($Bi_2O_3$), tungsten trioxide ($WO_2$), tungsten pentoxide ($W_2O_5$), zinc oxide (ZnO), zircon ($ZnSiO_4$), tin oxide ($SnO_2$), scandium oxide ($Sc_2O_3$), silicon monoxide (SiO), cadmium telluride (CdTe), antimony sulfide ($Sb_2S_3$), antimony trioxide ($Sb_2O_3$), cadmium sulfide (Cas), and tellurium (Te).

11. The reflector of claim 1 wherein all H or L are one quarter wave optical thickness.

12. The reflector of claim 1 wherein for both S and S' the individual layers H or L adjacent M are adjusted in optical thickness such that transmission of infrared radiation is maximized.

* * * * *